(12) United States Patent
Kawaberi

(10) Patent No.: US 7,312,835 B2
(45) Date of Patent: Dec. 25, 2007

(54) PROJECTION TYPE DISPLAY APPARATUS

(75) Inventor: Seiji Kawaberi, Kanagawa (JP)

(73) Assignee: Sony Corporation, Tokyo (JP)

( * ) Notice: Subject to any disclaimer, the term of this patent is extended or adjusted under 35 U.S.C. 154(b) by 501 days.

(21) Appl. No.: 10/914,131

(22) Filed: Aug. 10, 2004

(65) Prior Publication Data

US 2005/0062896 A1     Mar. 24, 2005

(30) Foreign Application Priority Data

Aug. 13, 2003  (JP)  ............................. 2003-293020
Jun. 16, 2004  (JP)  ............................. 2004-178365

(51) Int. Cl.
*H04N 5/64* (2006.01)
(52) U.S. Cl. ...................... 348/779; 348/778; 348/744; 348/655
(58) Field of Classification Search ........ 348/744–747, 348/778, 779, 808, 658, 655
See application file for complete search history.

(56) References Cited

U.S. PATENT DOCUMENTS 5,055,922 A * 10/1991 Wessling .................... 348/779
5,181,103 A * 1/1993 Aoyama ..................... 348/658
5,559,564 A * 9/1996 Nomura ..................... 348/779
5,644,360 A * 7/1997 Gurley et al. ............... 348/381

* cited by examiner

*Primary Examiner*—Michael H. Lee
(74) *Attorney, Agent, or Firm*—Oblon, Spivak, McClelland, Maier & Neustadt, P.C.

(57) ABSTRACT

In a projection type display apparatus including a blue CRT display apparatus with low luminous efficiency and low luminous efficiency, the present invention seeks to improve contrast while suppressing the fall in brightness for red, green, and blue color as a whole. In the projection type display apparatus, the images of three colors outputted from three monochrome CRT display apparatuses 10R, 10G, 10B which respectively output monochromatic video signals of red, green, and blue color, are respectively projected on a screen unit 14 via a reflecting mirror 12 so as to synthesize a image of three colors and generate a color image. The brightness of the green CRT display apparatus which outputs the green image having the highest luminous efficiency is increased, while maintaining the brightness of the blue CRT display apparatus 10B. Further, a light absorption means for tinting to reduce the increased green brightness is provided to balance the whole brightness of red, green, and blue. Contrast is improved by the light absorption means for tinting. Preferably, the red CRT display apparatus 10R is treated similarly to the green CRT display apparatus 10G.

12 Claims, 7 Drawing Sheets

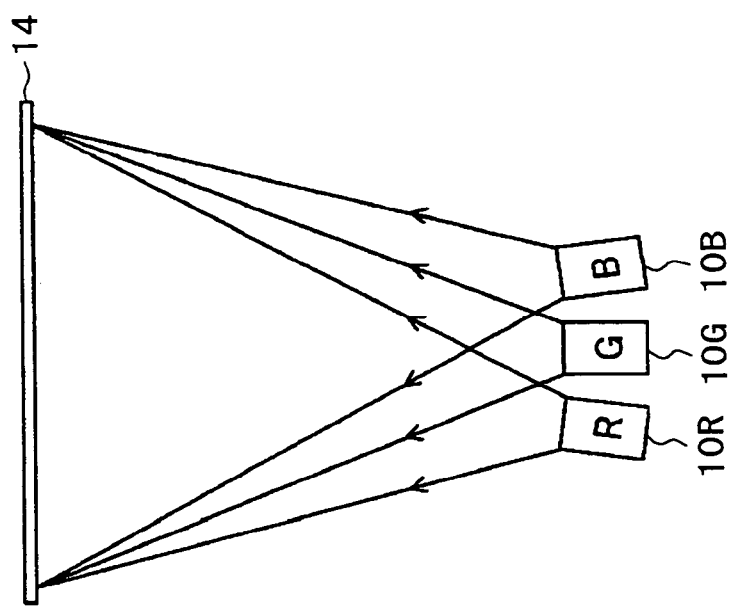
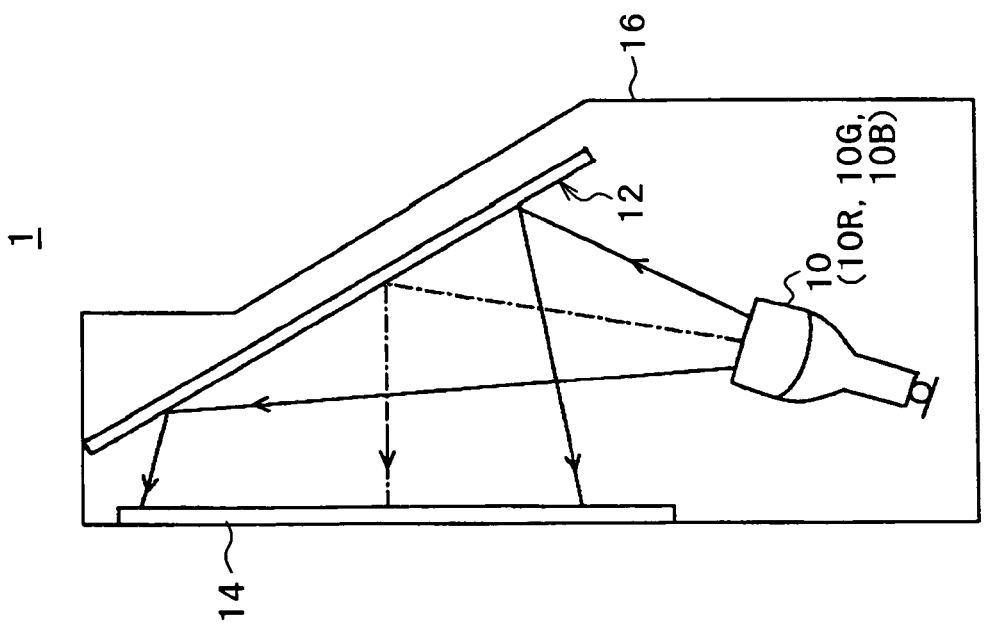

PROJECTION TYPE DISPLAY APPARATUS

CROSS REFERENCE TO RELATED APPLICATIONS

The present document is based on Japanese Priority Application JP2003-293020 filed to the Japanese Patent Office on Aug. 13, 2003, the content of which being incorporated herein by reference to the extent permitted by law.

BACKGROUND OF THE INVENTION

1. Field of the Invention

The present invention relates to a projection type display apparatus. In particular, the present invention relates to a projection type display apparatus for improving contrast while suppressing a fall in brightness in the projection type display apparatus as a whole.

2. Related Art

As an example of a structure of a projection type display apparatus, a cathode-ray tube (CRT: Cathode Ray Tube) rear projector apparatus will be described with reference to FIGS. 1(A), 1(B), FIG. 2, FIG. 3 and FIG. 4. In addition, the basic structure of the CRT rear projector apparatus is the same as that of a conventional technique and that of a preferred embodiment according to the present invention. Referring to FIGS. 1(A), 1(B), FIG. 2, FIG. 3 and FIG. 4, the structure, operations, etc. of the CRT rear projector apparatus will be described in detail in "Best Mode for Implementing the Invention."

As shown in FIG. 1(A) a CRT rear projector apparatus 1 includes a CRT video projection unit 10, a reflecting mirror 12, a screen unit 14, and a casing 16. The CRT video projection unit 10, the reflecting mirror 12, and the screen unit 14 are accommodated in the casing 16. As shown in FIG. 1(B), the CRT video projection unit 10 includes a red CRT display apparatus 10R, a green CRT display apparatus 10G, and a blue CRT display apparatus 10B which output monochromatic images respectively.

FIG. 2 representatively shows a schematic cross-sectional structure of the red CRT display apparatus 10R. The red CRT display apparatus 10R includes a CRT display tube 101, a coupler 103, a lens unit 104, and a deflecting yoke 102 which is provided around the perimeter of a neck portion of the CRT display tube 101 and deflects an electron beam. An electron gun (not shown), a fluorescent material 101a, etc. are provided inside the CRT display tube 101, and a face glass 105 is provided in the front. The coupler 103 is a unit which combines the CRT display tube 101 and the lens unit 104. Since the CRT display tube 101 reaches a considerably high temperature, cooling fluid 103a is accommodated. The image outputted from the CRT display tube 101 penetrates the coupler 103, and is magnified with a plurality of lenses in the lens unit 104, then projected on the reflecting mirror 12 which is located on a front surface of the red CRT display apparatus 10R.

The respective monochrome images outputted from the red CRT display apparatus 10R, the green CRT display apparatus 10G, and the blue CRT display apparatus 10B are directed to the reflecting mirror 12, reflected in the reflecting mirror 12, and then projected on the screen unit 14, so as to be synthesized into a color image on this screen unit 14.

As illustrated in FIG. 3 the screen unit 14 includes a Fresnel lens 145, a lenticular lens 143, and a screen 141 which are disposed along the direction of movement of the images directed from the reflecting mirror 12 to the screen unit 14.

Being reflected in the reflecting mirror 12, the respective monochrome images of red, green, and blue are projected (make an image) on the screen 141 via the Fresnel lens 145 and the lenticular lens 143, so that the respective monochrome images of red, green, and blue are synthesized into a color image. A viewer 20 can see the color image projected on the screen 141.

Generally explaining a display apparatus, it is always a technically big proposition "to make black as black as possible" in order to improve quality of image. Similarly, as for the CRT rear projector apparatus, there is no exception to the fact that "to display black as black as possible" is an important factor to the improvement in quality of image. Thus, as to a variety of conventional display apparatuses, various measures have been taken for the proposition "to display black as black as possible."

FIG. 4 is a view for illustrating relationships among main light, stray light, and outside light in a color CRT of an image receiving apparatus of a conventional color television set. It is known that since a fluorescent material used for a color CRT is white in principle, a portion which is not excited by an electron beam, that is a black portion in terms of an image, stands out in white when irradiated with the outside light, so that the contrast (=white brightness/black brightness) of display may be reduced or the contrast of display is lost.

As for conventional color television receivers, in order to improve the fall in contrast of display, the face glass of the color CRT etc. is generally tinted so as to reduce image light (attenuation) (see Japanese Laid-open Patent Application No. H06-139968, Japanese Laid-open Patent Application No. 2000-324427, for example).

In other words, as will be described hereinafter with reference to FIG. 4, tinting may cause the attenuation of the outside light and the attenuation of the stray light, which improves the contrast.

(1) Attenuation of Outside Light

As illustrated in FIG. 4, the main light from the fluorescent material in the color CRT passes through the tinted face glass once. On the other hand, the outside light passes through it twice, at the time of being incident to the tinted face glass and at the time of leaving the tinted face glass. Therefore, the attenuation of outside light is larger than that of the main light.

(2) Attenuation of Stray Light

As illustrated in FIG. 4, light from a light emission portion of the fluorescent material in the color CRT is reflected in a boundary face of the tinted face glass, so that a fluorescence side of the black portion which should not shine is illuminated, and the black stands out. This light is called stray light. At this time, the number of attenuations of the stray light passing through the tinted face glass is three or more. Further, its angle is oblique and its path is long, so that the attenuation of the stray light is considerably greater than that of the main light. Thus, in the conventional color CRT, using the tinted face glass improves the contrast and contributes to the improvement in quality of image.

SUMMARY OF THE INVENTION

Effects due to the tinted face glass in the conventional color television receiver as mentioned above have been predicted to some extent to be available also in the CRT rear projector apparatus. However, the tinting technique has not been adopted to the CRT rear projector apparatus for the following reasons, etc.

The first reason is that when the face glass in the CRT rear projector apparatus is subjected to the tinting process, the main light falls in brightness. In other words, as illustrated in FIG. 1(A), in the CRT rear projector apparatus where image light is emitted from the fluorescent material in the CRT display tube 101 of the CRT image projection unit 10, the image from the CRT image projection unit 10 is reflected in the reflecting mirror 12, further, the images are projected on the screen unit 14, so as to synthesize a image, the reflection and the projection cause the intensity of light to fall during the process, thus reducing the intensity (brightness) of light is large as compared with that of the conventional color television receiver. Thus, it is hard to obtain sufficient brightness with respect to the image projected on the screen 141 of the screen unit 14. Such a fall in brightness of the main light may reduce the quality of image of the image displayed on the screen unit 14 (screen 141). Because of the reasons as mentioned above, the tinting process has been avoided for the face glass in the CRT rear projector apparatus.

The second reason is that, as shown in FIG. 5 having enlarged and illustrated the face glass 105 and the fluorescent material 101a, as illustrated in FIG. 2, of the CRT display tube 101, even if the face glass 105 of the CRT display tube 101 in the CRT rear projector apparatus is tinted, there is no effect of the attenuation of the outside light as mentioned above, because the outside light does not reach a portion of face glass 105. The effect is caused only by "the attenuation of stray light."

Therefore, as for the whole CRT rear projector apparatus, in order to attenuate the outside light, priority is naturally given to tinting the lenticular lens 143 or the Fresnel lens 145 located on a front surface of the screen 141 as illustrated in FIG. 3, whereby, in addition to the first reason, the brightness of the main light is further reduced, and in fact it is difficult to tint the face glass 105 of the CRT display tube (for example, the CRT display tube 101 in the red CRT display apparatus 10R, or the green CRT display apparatus 10G).

FIG. 5 is a partially enlarged view of the CRT display tube 101 as illustrated in FIG. 2 and the fluorescent material 101a and the face glass 105 are partially enlarged and illustrated.

The third reason is that, as for a conventional color CRT used for a color television receiver etc., luminous efficiency of a blue fluorescent material is low as compared with luminous efficiency of a red fluorescent material, and luminous efficiency of a green fluorescent material. Similarly, among the monochrome CRT display tubes used for the CRT rear projector apparatus, the blue CRT display tube results in low luminous efficiency with respect to its blue fluorescent material. In addition, as illustrated in FIG. 6, as for the luminous efficiency, when a drive current increases, the luminous efficiency of the blue (B) fluorescent material is considerably reduced, because of a saturation property of the fluorescent material. FIG. 6 is a graph showing the drive current (horizontal axis) of the fluorescent material of each of the monochrome CRT display tubes in the CRT rear projector apparatus, and a decrease in luminous efficiency (vertical direction), and showing the way in which, assuming that the luminous efficiency when the drive current is small is 1.0, the luminous efficiency falls as the drive current becomes large. It indicates that the decrease in blue luminous efficiency is significant as the drive current applied to the blue CRT display tube increases.

Further, as illustrated in FIG. 7, in the CRT rear projector apparatus, among the monochrome CRT display tubes, a white current ratio of the blue CRT display tube is high. FIG. 7 is a graph showing a relationship between a total beam current of the monochrome CRT display tubes (blue, green, red) and a white current ratio of each of the monochrome CRT display tubes (blue, green, red).

It should be noted that a ratio of a total beam current of monochrome CRT display tubes which respectively output blue, green, and red monochromatic light in order to obtain white, to a beam current of each of the red, green, and blue monochrome CRT display tubes at that time will be referred to as white current ratio.

The white current ratios of respective monochrome CRT display tubes at the time of working (or at the time of operation) as shown in FIG. 7 with the broken line are, for example, 50% for the blue CRT display tube, 33% for the green CRT display tube, and 17% for the red CRT display tube.

As a result, one can know the beam current of each of the monochrome CRT display tubes. For example, the beam current of the blue CRT display tube is 0.75 mA; the beam current of the green CRT display tube is 0.5 mA; the beam current of a red CRT display tube is 0.25 mA. The blue CRT display tube (blue CRT display apparatus) needs the greatest drive current.

The CRT display tube is heated to a high temperature in the CRT rear projector apparatus. Also in the CRT display tube as illustrated in FIG. 2, it is cooled by using cooling fluid 103a in the coupler 103, so that each of the monochrome CRT display tubes needs to be cooled. If the drive current for the CRT display tube is increased, the brightness will be raised, however it is heated to a higher temperature.

In order to raise the brightness of blue with low brightness, there is a limit to further increasing the drive current for the CRT display tube 101 of the blue CRT display apparatus 10B.

The improvement in the luminous efficiency etc. of the fluorescent material of the blue CRT display apparatus has been desired over an extended period, however it has not yet solved.

On the other hand, as illustrated in FIG. 7 the red CRT display apparatus 10R and the green CRT display apparatus 10G have sufficient drive currents. Further, as illustrated in FIG. 6 even if the drive currents are increased, a considerable fall in luminous efficiency does not occur unlike the blue one. Therefore, the drive currents of the red CRT display apparatus 10R and the green CRT display apparatus 10G can be increased so that red and green brightness can be increased still further.

However, from a viewpoint of a white balance, only a part of the capacity of the red CRT display apparatus 10R and the green CRT display apparatus 10G is used corresponding to the limited capacity of the luminous efficiency (brightness) of the blue CRT display apparatus 10B.

Thus, as for the CRT rear projector apparatus, the lower brightness in blue luminescence, the lower luminous efficiency, etc. of the blue CRT display apparatus 10B cause a bottleneck in improving quality of image.

In other words, apart from a conventional color television receiver using a color CRT, the CRT rear projector apparatus suffers from a disadvantage that it cannot employ a provision for improvement as it is, prepared for the color CRT, so as to improve the quality of image, because the balance among red, green, and blue is bad. A provision peculiar to the CRT rear projector apparatus has been desired.

An aim of the present invention is to solve the above-mentioned problems and provide a projection type display apparatus which realizes improvement in contrast, while suppressing the fall in brightness in the projection type display apparatus as a whole.

A basic concept of the present invention is in that, based on the premise that the whole balance among brightness of red light, green light, and blue light respectively emitted from the monochrome CRT display tubes, any of the brightness of the monochrome CRT display apparatuses is increased which output images of the red light, the green light, and the blue light respectively, the whole brightness of red, green, and blue is balanced by way of a tinting method of reducing the brightness of light corresponding to the increased brightness.

Based on the above-mentioned basic concept of the present invention, according to a first preferred embodiment of the present invention, there is provided a projection type display apparatus for respectively projecting images outputted from three monochrome CRT display apparatuses which respectively output red, green, and blue image lights so as to be synthesized on a screen, the projection type display apparatus including a first light absorption means for reducing brightness of the above-mentioned green image light to the extent to be balanced with respect to the above-mentioned red and blue brightness, the first light absorption means being provided in the green CRT display apparatus which outputs the above-mentioned green image light.

In the first preferred embodiment of the present invention, it is preferable that a beam current of the green CRT display apparatus which outputs the above-mentioned green image light is increased by an amount of brightness reduced by the above-mentioned first light absorption means so as to output the image having increased the brightness of green light.

The basic concept and the first preferred embodiment of the present invention will be described.

Relative luminous efficiency has a peak in a medium wavelength band, or a green wavelength band. It is known that the luminous efficiency is reduced as it moves to a long wavelength and a short wavelength. Green has a relative sensitivity peak at approximately 540 nm, blue has a relative sensitivity peak at approximately 450 nm, and red has a relative sensitivity peak at approximately 600 nm, so that the medium wavelength band corresponds to a green wavelength band, for example, a short wavelength band corresponds to a blue wavelength band, for example, and a long wavelength band corresponds to a red wavelength band, for example. It is said in general that luminous efficiency is proportioned as red green:blue=2:5:1.

Green luminous efficiency is the highest. Thus, it is considered that green is most related to the stray light which damages contrast.

In addition, by "luminous efficiency" we mean efficiency of human visual system with respect to light. Generally, it is expressed by a spectral sensitivity. The relative luminous efficiency is used as efficiency for a sensitivity of brightness. In this specification, luminous efficiency or relative luminous efficiency is used.

From various viewpoints as mentioned above, as the first preferred embodiment of the present invention, green has the highest luminous efficiency (relative luminous efficiency) among red, green, and blue. Moreover, as illustrated in FIG. 6 even when the drive current for the CRT display tube for green is increased so as to increase the brightness, green substantially does not reduce the luminous efficiency. Further, as can be seen from the property of the white current ratio illustrated in FIG. 7, the green CRT display tube allows sufficient room for drive current to be increased.

Thus, the drive current for the CRT display tube of the green CRT display apparatus is increased so as to raise the green brightness. While the first light absorption means for reducing the brightness of the green image light having increased is provided, and the green brightness is reduced, so that the red and blue to be synthesized are balanced.

By providing the first light absorption means which is tinted, for example, in the green CRT display apparatus, the improvement in the contrast is attained. In other words, the black brightness which determines contrast is improved because the first absorption means is provided in the green CRT display apparatus. Especially it is considered that green greatly affects the generation of the stray light which damages contrast. According to the present invention, green tinting reduces the stray light.

On the other hand, in the first preferred embodiment of the present invention, a light absorption means is not provided in the red CRT display apparatus or the blue CRT display apparatus so as not to increase the drive current.

As a result, red, green, and blue as a whole can maintain the brightness equivalent to the conventional one.

According to another preferred embodiment of the present invention, in addition to the first preferred embodiment, there is provided a projection type display apparatus including a second light absorption means for reducing the brightness of the above-mentioned red image light to the extent to be balanced with respect to the above-mentioned green and blue brightness, the second light absorption means being provided in the red CRT display apparatus which outputs the above-mentioned red image light.

In the second aspect of the present invention, it is preferable that the beam current of the red CRT display apparatus which outputs the above-mentioned red image light is increased by an amount of brightness reduced by the above-mentioned second light absorption means so as to output the image having increased the brightness of red light.

As for this preferred embodiment of the present invention, in addition to the first preferred embodiment of the present invention, the second light absorption means for reducing red is provided in the red CRT display tube having luminous efficiency lower than that of green and luminous efficiency higher than that of blue, so that contrast can be improved while maintaining the whole brightness of the above-mentioned red, green, blue, in addition to the improvement in the contrast, by providing the first light absorption means in the green CRT display tube as mentioned above.

As illustrated in FIG. 7 the CRT display tube of the red CRT display apparatus allows room for the drive current. As illustrated in FIG. 6, there is a small fall in the luminous efficiency due to the increase in drive current.

In addition to the CRT display tube of the green CRT display apparatus of the first preferred embodiment, in this preferred embodiment of the present invention, the drive current for the CRT display tube of the red CRT display apparatus is increased so as to derive an excessive capacity, increase the red brightness, reduce the increased amount of brightness by means of the second light absorption means, and balance with respect to green and blue.

A blue absorption means is not provided in the blue CRT display apparatus. The drive current is not changed either. Thus, in this preferred embodiment of the present invention, in addition to green, the red brightness is also controlled, so that the black brightness which determines contrast is further improved.

As a still further preferred embodiment of the present invention, there is provided a projection type display apparatus, in addition to the first and second aspects, further including a third light absorption means for reducing the brightness of the above-mentioned blue image light to the extent to be balanced with respect to the above-mentioned green and red brightness, the third light absorption means being provided in the blue CRT display apparatus which outputs the above-mentioned blue image light.

As for this still further preferred embodiment of the present invention, since the third light absorption means for reducing blue is provided in the blue CRT display tube, contrast can be further improved.

However, a rate at which third light absorption means absorbs blue and reduces the brightness (or luminous efficiency) is lower than a rate at which the first light absorption means absorbs green and/or a rate at which the second light absorption means absorbs red. The reason is that the luminous efficiency of blue is lower than that of green or red, and if the rate at which the third light absorption means absorbs blue is too large, the whole brightness of red, green, and blue decreases.

Thus, when the third light absorption means for reducing blue is provided in the blue CRT display tube, contrast can be improved further.

Preferred embodiments of the first to the third light absorption means will be described in the following.

Each of three CRT display apparatuses for monochrome includes: a CRT display tube having therein an electron gun and a fluorescent material, and provided with a face glass on the front surface; a coupler having therein a cooling fluid for cooling the above-mentioned CRT display tube, the coupler being located on a front surface of the face glass; a projection lens unit for enlarging a image outputted from the above-mentioned CRT display tube, and passed through the above-mentioned coupler, so as to be projected towards, the projection lens unit being located on a front surface of the coupler; and a deflecting yoke for deflecting an electron beam in the above-mentioned CRT display tube.

Each light absorption means may be any of the following:

(1) A light absorption agent which absorbs a corresponding color. The light absorption agent which absorbs the corresponding color is mixed with the above-mentioned face glass so as to constitute the face glass.

(2) A light absorption liquid which absorbs the corresponding color, and is mixed into a cooling fluid which is filled in the above-mentioned coupler.

(3) A light absorption means for absorbing the corresponding color. It is provided in the above-mentioned lens unit or mixed with the lens within the above-mentioned lens unit.

Referring to FIG. 2 and FIG. 5, by arranging such a light absorption means, it is possible to reduce the stray light occurred inside the face glass of the CRT display tube, a cooling medium in the coupler, in the circumference portions of the lens unit etc., especially the stray light originated from green. In other words, it is possible to reduce the light which illuminates a fluorescent material, from the outside of the CRT display tube, and also improve contrast.

According to the preferred embodiments of the present invention, in the projection type display apparatus, without causing the brightness of red, green, and blue as a whole to fall, the contrast for the whole projection type display apparatus can be improved.

Moreover, according to the preferred embodiments of the present invention, the drive capacity of the green CRT display tube, more preferably the red CRT display tube, which have enough drive capacity can be increased so as to derive the excessive capacity.

Since the light absorption means used in the preferred embodiments of the present invention does not occupy significant space, the CRT display apparatus doe not increase in size.

BRIEF DESCRIPTION OF THE DRAWINGS

The above and other objects and features of a preferred embodiment of the present invention will become more readily apparent to those of ordinary skill in the art from the following detailed description taken in conjunction with the accompanying drawings in which:

FIGS. 1(A), (B) show construction of a CRT rear projector apparatus as a preferred embodiment of a projection type display apparatus in accordance with the present invention;

FIG. 1(A) is a cross-sectional view of the CRT rear projector apparatus;

FIG. 1(B) is an optical system view having shown relationships among a screen unit and three CRT display apparatuses (projection apparatuses) viewed from above of FIG. 1(A) not via a reflecting mirror;

DETAILED DESCRIPTION OF THE PREFERRED EMBODIMENTS OF THE INVENTION

Structure of CRT Rear Projector Apparatus

As a first preferred embodiment of a projection type display apparatus of the present invention, a CRT rear projector apparatus will be described with reference to FIG. 1(A), (B), FIG. 2 and FIG. 3.

FIG. 1(A) is a cross-sectional view of a CRT rear projector apparatus. FIG. 1(B) is a view of an optical system having shown a relationship between the screen unit 14 and three CRT display apparatuses (projection apparatus) not via the reflecting mirror 12, viewing from above of FIG. 1(A).

Figure 2:
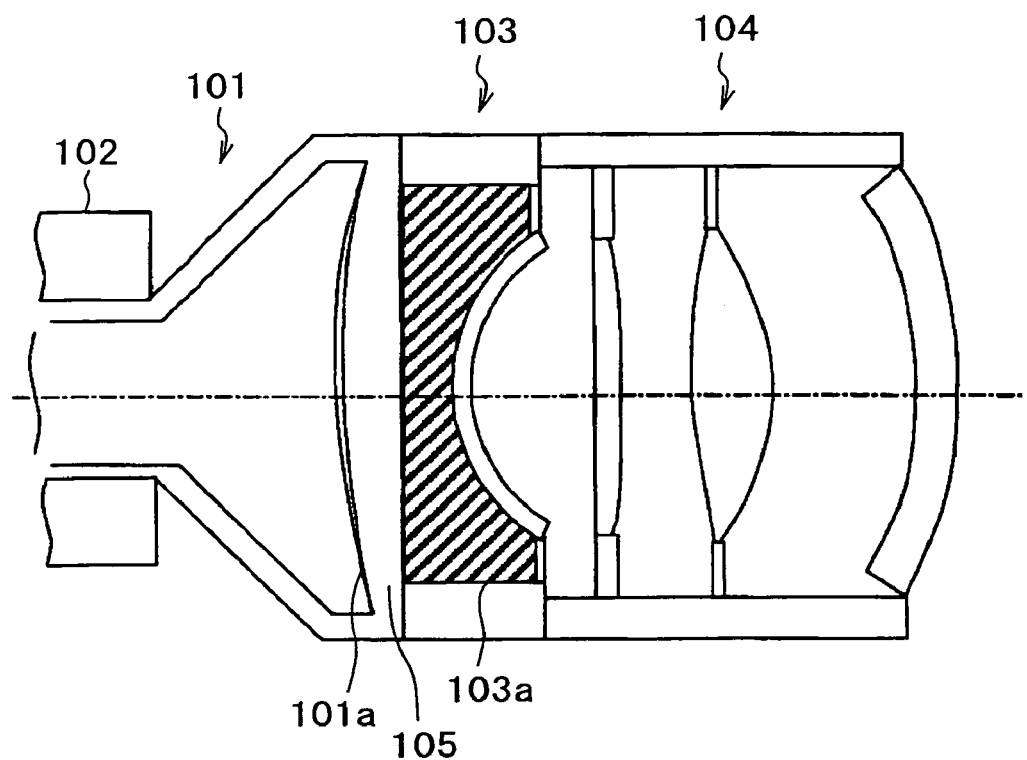
FIG. 2 is a cross-sectional view of the CRT display apparatus used for the CRT rear projector apparatus as illustrated in FIGS. 1(A) and (B)

FIG. 2 is a cross-sectional view of a red CRT display apparatus 10R representatively illustrated among three CRT display apparatuses used for the CRT rear projector apparatus.

Figure 3:
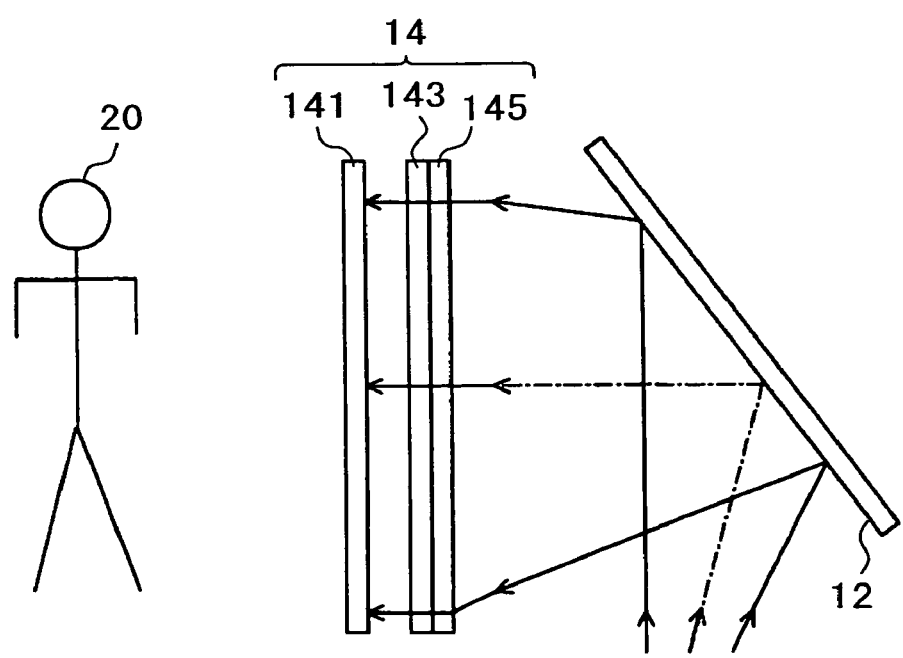
FIG. 3 is an enlarged cross-sectional view of the screen unit as illustrated in FIG. 1(A)
Figure 4:
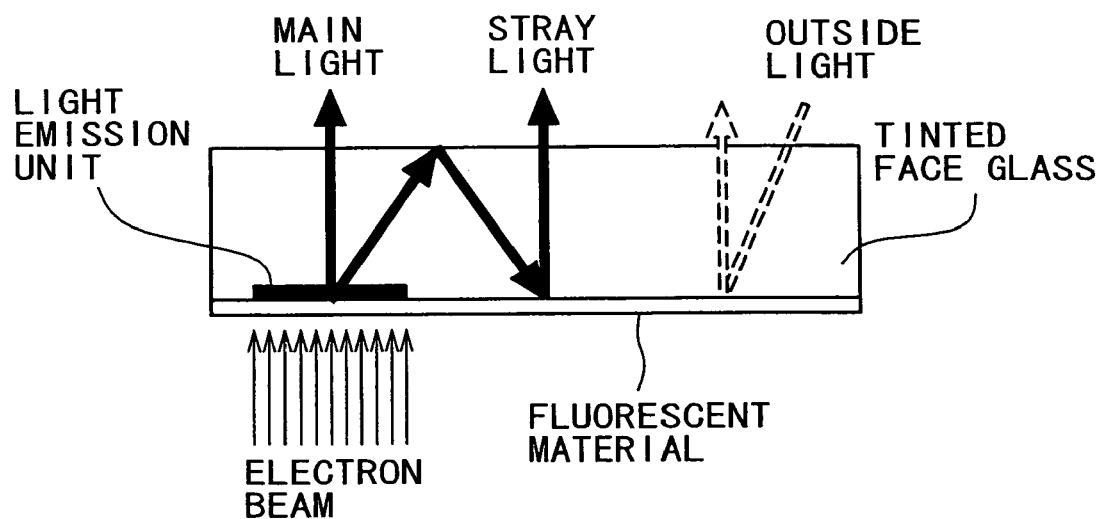
FIG. 4 is a view for illustrating relationships among main light, stray light and outside light in a color CRT display tube.

FIG. 3 is a cross-sectional view of the screen unit as illustrated in FIG. 1(A).

The CRT rear projector apparatus 1 includes the CRT image projection unit 10, the reflecting mirror 12, the screen unit 14, and the casing 16. The CRT image projection unit 10, the reflecting mirror 12 and the screen unit 14 are accommodated in the casing 16.

As illustrated in FIG. 1(B) the CRT image projection unit 10 includes three CRT display apparatuses (projection apparatuses) for outputting monochromatic images respectively, which are the red CRT display apparatus 10R for outputting a red (R) image, the green CRT display apparatus 10G for outputting a green (G) image, and the blue CRT display apparatus 10B for outputting a blue (B) image.

The red CRT display apparatus 10R, the green CRT display apparatus 10G, and the blue CRT display apparatus 10B are the CRT display apparatuses which respectively output the monochrome images of red (R), green (G), and blue (B), basically have the same structure, and operate on the same principle, except that each has different fluorescent material.

A red video signal is applied to the red CRT display apparatus 10R. A green video signal is applied to the green CRT display apparatus 10G. A blue video signal is applied to the blue CRT display apparatus 10B.

FIG. 2 representatively shows a schematic structure of the red CRT display apparatus 10R. The red CRT display apparatus 10R includes the CRT display tube 101, the coupler 103 in which the cooling fluid 103a, such as for example a mixed solution mainly having ethylene glycol of low viscosity, is accommodated, the lens unit 104 in which the plurality of lenses are accommodated, and the deflecting yoke 102.

An electron gun (not shown), a shadow mask (not shown), the fluorescent material 101a, etc. are accommodated within a glass container of the CRT display tube 101. The face glass 105 is provided on the front surface of the CRT display tube 101.

The deflecting yoke 102 deflects the electron beam perpendicularly and horizontally which is directed to a fluorescence surface (not shown) provided in the CRT display tube 101. Interlaced scanning in the horizontal direction is carried out twice for each field so as to generate one frame of image.

The coupler 103 provided on a front surface of the face glass 105 on the front surface of the CRT display tube 101 is a point where the CRT display tube 101 and the lens unit 104 are connected, so that the CRT display tube 101 used for the CRT rear projector apparatus 1 reaches a considerable high temperature, thus the above-mentioned cooling fluid 103a is accommodated in the coupler 103.

The plurality of lenses are accommodated in the lens unit 104 so as to enlarge the image outputted from the CRT display tube 101 and project it on the reflecting mirror 12.

The green CRT display apparatus 10G and the blue CRT display apparatus 10B have the same structure as the red CRT display apparatus 10R.

The monochrome images of red, green, and blue respectively emitted from the red CRT display apparatus 10R, the green CRT display apparatus 10G, and the blue CRT display apparatus 10B to the reflecting mirror 12 are reflected in the reflecting mirror 12, and projected on the screen unit 14, so that the images of red, green, and blue are synthesized into a synthesized color image at the screen unit 14. Then, the viewer 20 can see the image projected on the screen unit 14.

As illustrated in FIG. 3 the screen unit 14 includes a Fresnel lens 145, a lenticular lens 143, and the screen 141 which are disposed along the direction of movement of the images directed from the reflecting mirror 12 to the screen unit 14.

Being reflected in the reflecting mirror 12, the respective monochrome images of red, green, and blue are projected (make an image) on the screen 141 via the Fresnel lens 145 and the lenticular lens 143, so that the respective monochrome images of red, green, and blue are synthesized into a color image. The viewer 20 can see the color image projected on the screen 141.

As described above, as for the color television receiver using a conventional color CRT, etc., "to display black as deep as possible" is an important key to the improvement in quality of image. Thus, by way of tinting, the attenuation of the outside light and the attenuation of the stray light are carried out so as to realize the improvement in contrast. As described above the effects due to the tinted face glass 105 in the CRT display tube 101 have been predicted to some extent to be available also in the CRT rear projector apparatus.

However, the tinting technique has not been adopted to the CRT rear projector apparatus for three reasons as described above. The three reasons will be briefly described again:

(1) A disadvantage that the brightness of the main light falls.
(2) Tinting of a panel glass of the CRT display tube in the CRT rear projector apparatus provides no attenuation effects of the outside light but effects caused only by "the attenuation of stray light", because the outside light does not reach the portion.
(3) In the CRT rear projector apparatus, since the luminous efficiency of the blue CRT display tube is low and the white current ratio has been chosen to be large so as to increase the drive current, it is difficult to increase the drive current in order to raise the blue brightness, because it increases the temperature of the CRT display tube.

The present inventor has found how to comprehensively solve the problems as mentioned above, which will be described hereinafter:

First Preferred Embodiment

As illustrated in FIG. 1(A), for example, as compared with the projection apparatus using a CRT display tube, a sufficient brightness may not be obtained in the CRT rear projector apparatus in which the color images of three colors, red, green, and blue, emitted from the CRT image projection unit 10 are reflected in the reflecting mirror 12, then the reflected monochrome color images are projected on the screen unit 14, so as to be synthesized, thus there is a tendency for the brightness of the image in the screen unit 14 to become low.

Figure 6:
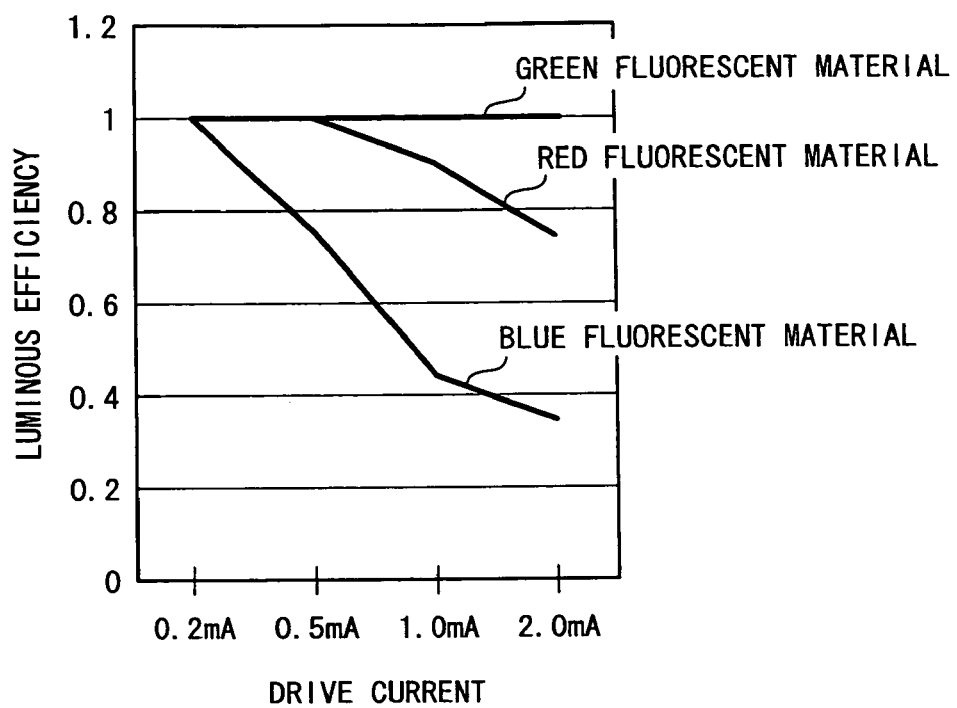
FIG. 6 is a graph showing a fall property of the luminous efficiency corresponding to a change of drive currents for R, G, and B.
Figure 7:
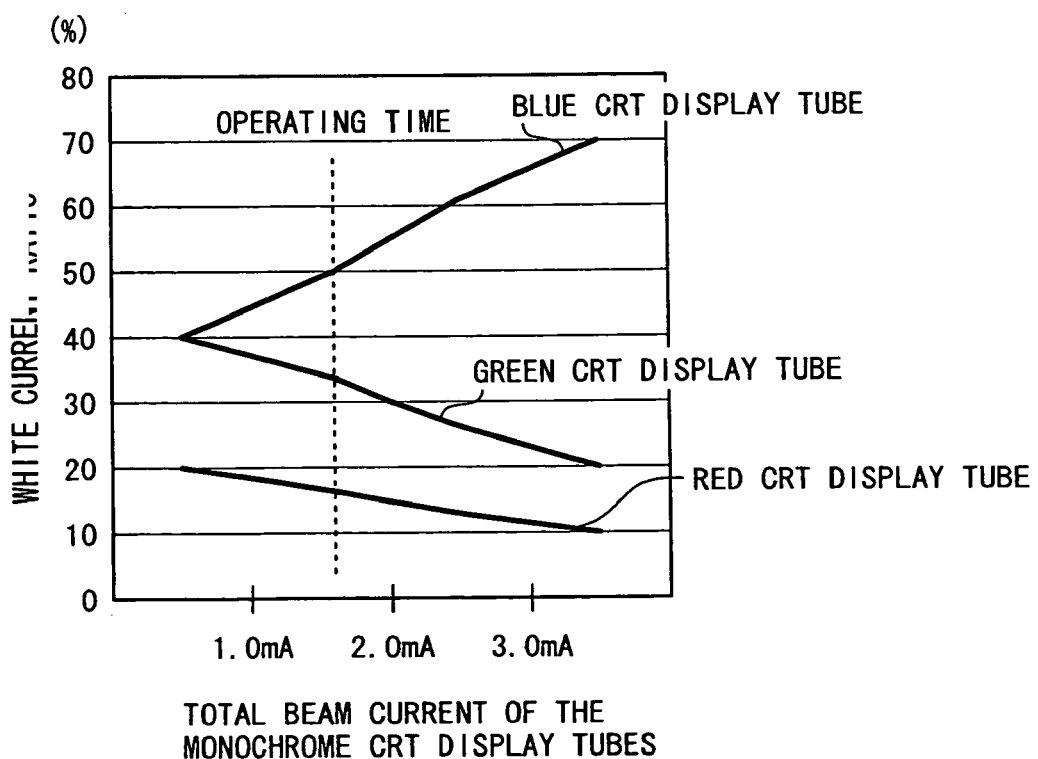
FIG. 7 is a graph showing the white current ratio of R, G, and B over a total of RGB beam currents.

Especially, the blue luminous efficiency is low, the luminous efficiency is low, and the luminous efficiency corresponding to the increase in drive current is also reduced considerably as illustrated in FIG. 6. The white current ratio is also high as illustrated in FIG. 7.

(1) Thus, in order to raise the brightness of blue image, the drive current is not increased which is applied to the blue CRT display apparatus 10B where there is a restriction in its drive current due to the heat generation in the CRT display tube, but maintained in the same brightness as the conventional one. On the other hand, a light absorption means as will be described later is not provided in the blue CRT display apparatus 10B.

(2) On the other hand, at least for the green light the luminous efficiency is much higher than blue, so that the drive current for the green CRT display apparatus 10G having a sufficient drive current is increased to raise the brightness.

On the other hand, the first light absorption means for absorbing green is provided in the green CRT display apparatus 10G in order to reduce the brightness by the increased amount of brightness, so as to maintain the brightness similar to that before increasing the drive current for the green CRT display apparatus 10G, as the whole red, green, and blue at the time of the synthesis in the screen unit 14. In other words, the brightness of the whole red, green, and blue is balanced similar to that before increasing the drive current for the green CRT display apparatus 10G.

The degree of green brightness to be reduced by the first light absorption means can be determined, for example, with reference to the brightness saturation graph as illustrated in FIG. 6, the graph of the white current ratio as illustrated in FIG. 7, and in view of the drive current to be used.

Even if the drive current for the CRT display tube within the green CRT display apparatus 10G which has sufficient drive current is increased, it does not cause the problem that the CRT display tube reaches too high a temperature. Therefore, the cooling fluid 103a in the coupler 103 can employ the same material as a conventional one in the same conditions.

Further, as shown in FIG. 6, even if the drive current for the CRT display tube in the green CRT display apparatus 10G is increased, the luminous efficiency of green substantially does not fall.

In this way, the drive current for the CRT display tube in the green CRT display apparatus 10G is increased so as to derive the excessive capacity of the green CRT display apparatus 10G of its own, absorb the increased brightness by means of the first light absorption means which is provided in the green CRT display apparatus 10G, and balance with respect to the brightness of other colors, especially the blue brightness.

The black brightness which determines the contrast is improved because the first light absorption means is provided in the green CRT display apparatus 10G and the stray light originated from green having the high luminous efficiency is also decreased.

The first light absorption means to be provided in the green CRT display apparatus 10G can be provided at any portion of the green CRT display apparatus 10G. Its preferred embodiment will be described below.

First Example of First Light Absorption Means

Figure 8A:
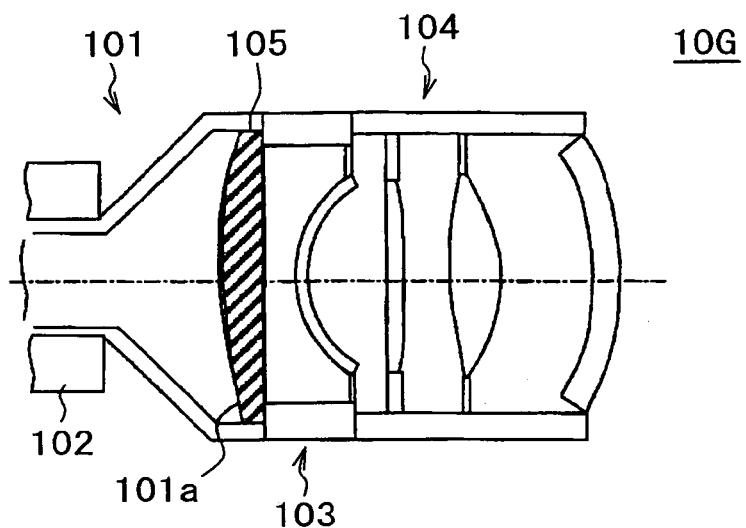
FIG. 8(A) to FIG. 8(C) are views illustrating an example in which a first light absorption means is provided in a green CRT display apparatus as a first preferred embodiment of the present invention.

As illustrated in FIG. 8(A) the first light absorption means can be arranged to tint (colorize) the face glass 105 on the front surface of the CRT display tube 101 in the green CRT display apparatus 10G, by means of a material which absorb green. The face glass 105 as shown hatched in FIG. 8(A) illustrates that it has been tinted.

The degree of absorption of green by means of the tinted face glass 105 can be determined with reference to the graph showing the fall in luminous efficiency as illustrated in FIG. 6, the graph showing the white current ratio as illustrated in FIG. 7 and in view of the drive current applied to the CRT display tube 101 of the green CRT display apparatus 10G, for example.

Figure 5:
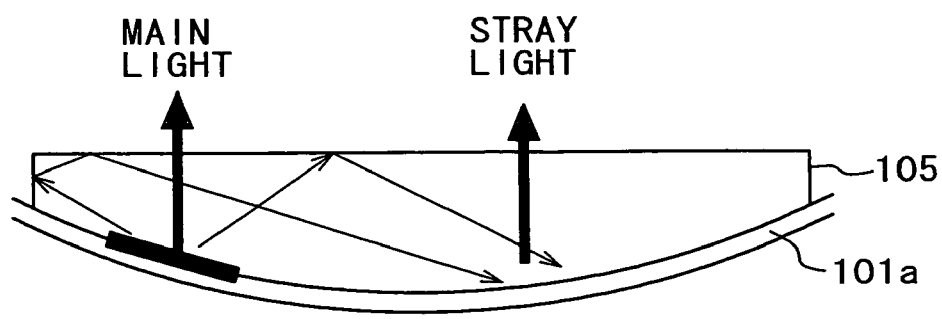
FIG. 5 is a partly enlarged view of the CRT display tube as illustrated in FIG. 2, partly illustrating a fluorescent material and a face glass.

The face glass 105 in the green CRT display apparatus 10G is tinted using the material which absorbs green, so as to reduce the stray light generated within the face glass 105 and in the circumference portions of the cooling fluid 103a in the coupler 103, the projection lens unit 104, etc. as illustrated in FIG. 5, that is, the light illuminating the fluorescent material provided in the CRT display tube 101 of the green CRT display apparatus 10G, from the outside of the CRT display tube 101.

As a result, it is possible to improve the contrast.

Second Example of First Light Absorption Means

Figure 8B:
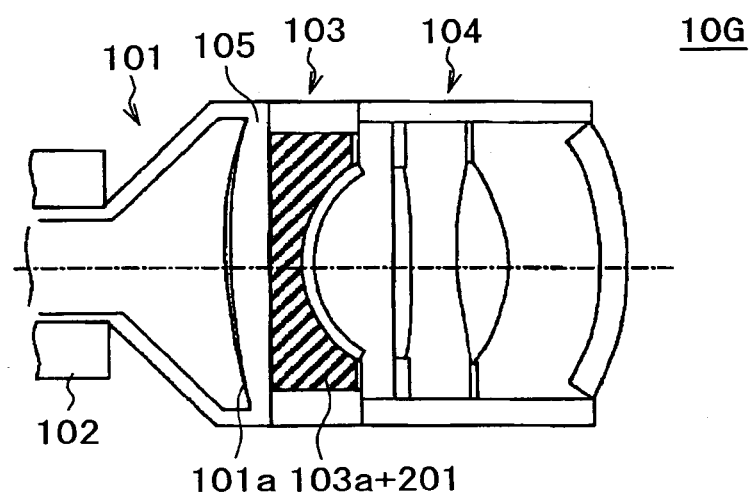

As illustrated in FIG. 8(B) the first light absorption means can be arranged to cause the cooling fluid 103a in the coupler 103 in the green CRT display apparatus 10G to contain a medium 201 which absorbs green. The cooling fluid 103a in the coupler 103 as shown hatched in FIG. 8(B) illustrates that it has been tinted by the tinting medium 201.

The degree of absorption of green by means of the tinting medium 201 can be determined with reference to the graph showing the fall in luminous efficiency as illustrated in FIG. 6 and the graph of the white current ratio as illustrated in FIG. 7, and in view of the drive current to be used, for example. In this case, it is also possible to obtain an effect similar to that when the face glass 105 in the first example is tinted.

Third Example of First Light Absorption Means

Figure 8C:
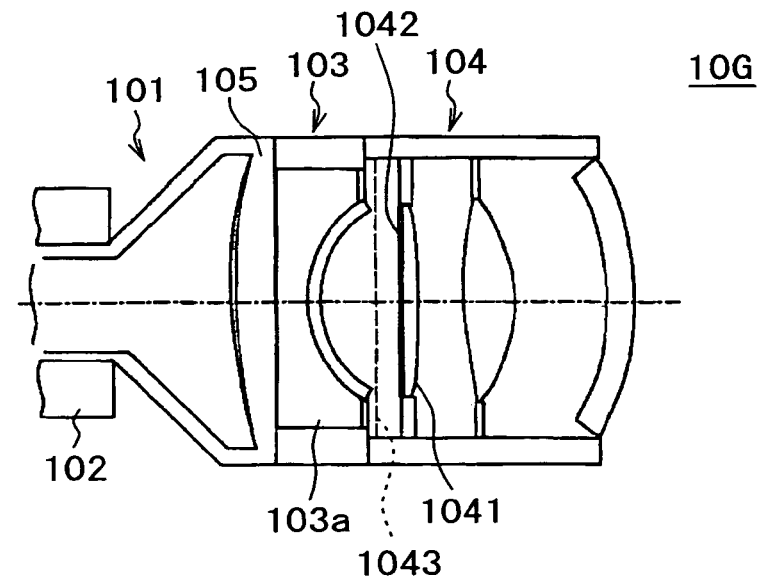

As illustrated in FIG. 8(C) the first light absorption means can be arranged such that a part of lens group of the lens unit 104 in the green CRT display apparatus 10G, such as for example a part of a lens 1041, is coated with a material 1042 which absorbs green or a filter 1043 which absorbs green can be inserted.

The degree of absorption of green can be determined with reference to the graph showing the fall in luminous efficiency as illustrated in FIG. 6 and the graph showing the white current ratio as illustrated in FIG. 7 and in view of the drive current to be used, for example. In this case, it is also possible to obtain an effect similar to that when the face glass 105 in the first example is tinted.

Second Preferred Embodiment

In addition to the first preferred embodiment, as for the second preferred embodiment, with respect to red which has the luminous efficiency lower than that of green but higher than that of blue, the red brightness is adjusted in a similar manner to the first preferred embodiment.

In the second preferred embodiment, an absorption means is not provided in the blue CRT display tube either. The same drive current as the conventional one is supplied.

On the other hand, as can be seen from the graph of the white current ratio as illustrated in FIG. 7, as for the red CRT display apparatus 10R which has sufficient drive current, similar to the green CRT display apparatus 10G, the drive current is increased so as to raise the red brightness. While the second light absorption means for absorbing red is provided in the red CRT display apparatus 10R, so that the red brightness is reduced to the extent to balance the brightness of the whole red, green, and blue.

The degree of absorption of red can be determined with reference to the graph showing the fall in luminous efficiency as illustrated in FIG. 6 and the graph showing the white current ratio as illustrated in FIG. 7 and in view of the drive current to be used, for example.

Even if the drive current for the CRT display tube 101 of the red CRT display apparatus 10R is increased, the luminous efficiency does not greatly fall as illustrated in FIG. 6. Further, as illustrated in FIG. 7, red has the white current ratio lower than that of green and allows more room for the drive current as compared with the green CRT display apparatus 10G. Therefore, it is effective to increase the drive current for the CRT display tube 101 of the red CRT display apparatus 10R.

Thus, even if the drive current for the CRT display tube of the red CRT display apparatus 10R which has more room for the drive current as compared with the green CRT display apparatus 10G is increased, no problem arises in that the CRT display tube in the red CRT display apparatus 10R reaches too high a temperature. Therefore, the cooling fluid 103a in the coupler 103 in the red CRT display apparatus 10R can employ the same material as the conventional one.

Thus, in addition to adjusting the green brightness of the first preferred embodiment, in the second preferred embodiment, the drive current for the CRT display tube in the red CRT display apparatus 10R for outputting the red image which has the luminous efficiency greater than that of blue, is increased so as to derive an excessive capacity, to increase the red brightness, to absorb the increased amount of brightness by means of the second light absorption means provided in the red CRT display apparatus 10R, and to balance with respect to green and blue.

As a result, brightness of red, green, and blue as a whole can be maintained similar to the conventional one, without exceeding the maximum load specification of each of the CRT display tubes within the three, the green CRT display apparatus 10G, the blue CRT display apparatus 10B, and the red CRT display apparatus 10R.

Black brightness which determines contrast is further improved, because the first light absorption means is provided in the green CRT display apparatus 10G based on the first preferred embodiment, and because the second light absorption means is further provided in the red CRT display apparatus 10R according to the second preferred embodiment.

The second light absorption means can be provided at any portion of the red CRT display apparatus 10R. Its preferred embodiment will be described below.

First Example of Second Light Absorption Means

Figure 9A:
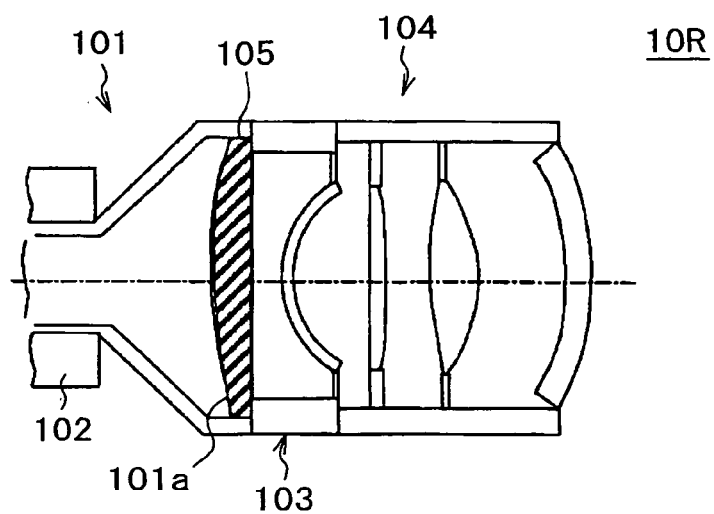
FIG. 9(A) to FIG. 9(C) are views illustrating an example in which a second light absorption means is provided in a red CRT display apparatus as a second preferred embodiment of the present invention.

As illustrated in FIG. 9(A) the second light absorption means can be arranged to tint (colorize) the face glass 105 on the front surface of the CRT display tube 101 in the red CRT display apparatus 10R, by means of a material which absorbs red. The face glass 105 as shown hatched in FIG. 9(A) illustrates that it has been tinted.

The degree of absorption of red by means of the face glass 105 can be determined with reference to the graph showing the fall in luminous efficiency as illustrated in FIG. 6 and the graph showing the white current ratio as illustrated in FIG. 7 and in view of the drive current to be used, for example.

As illustrated in FIG. 5 the face glass 105 in the red CRT display apparatus 10R is tinted in red, so as to reduce the stray light generated within the face glass 105 and in the circumference portions, such as the cooling medium 103a in the coupler 103 and the lens unit 104, that is the light illuminating the fluorescent material provided in the CRT display tube 101, from the outside of the CRT display tube 101, and to improve the contrast.

Second Example of Second Light Absorption Means

Figure 9B:
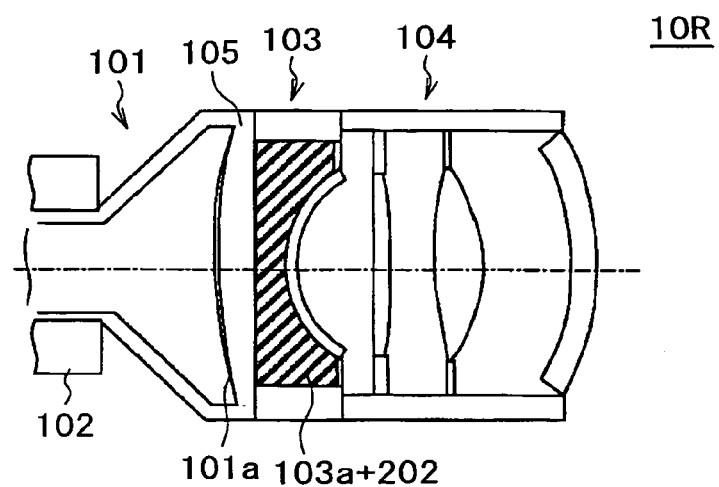

As illustrated in FIG. 9(B) the second light absorption means can be arranged to cause the cooling fluid 103a in the coupler 103 in the red CRT display apparatus 10R to contain a medium 202 which absorbs red. The cooling fluid 103a in the coupler 103 as shown hatched in FIG. 9(B) illustrates that it has been tinted by the medium 202.

The degree of absorption of red by means of the medium 202 can be determined with reference to the graph showing the fall in luminous efficiency as illustrated in FIG. 6 and the graph showing the white current ratio as illustrated in FIG. 7 and in view of the drive current to be used, for example. In this case, it is also possible to obtain an effect similar to that when the face glass 105 in the first example is tinted.

Third Example of Second Light Absorption Means

Figure 9C:
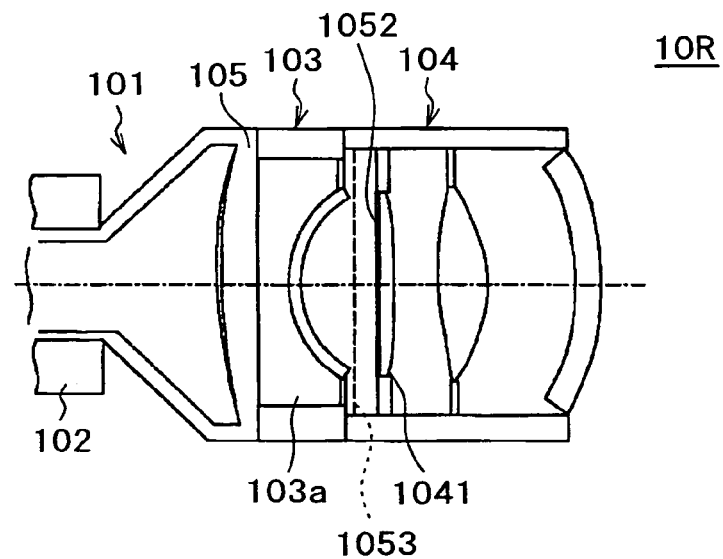

As illustrated in FIG. 9(C) the second light absorption means is arranged such that some lenses of the lens group of the projection lens unit 104 in the green CRT display apparatus 10G, such as for example, a part of the lens 1041, are coated with a tinting material 1052 which absorbs red, or a filter 1053 which absorbs red can be inserted.

The degree of absorption of red can be determined with reference to the graph showing the fall in luminous efficiency as illustrated in FIG. 6 and the graph showing the white current ratio as illustrated in FIG. 7 and in view of the drive current to be used, for example. In this case, it is also possible to obtain an effect similar to that when the face glass 105 in the first example is tinted.

Third Preferred Embodiment

In addition to the first and second preferred embodiments, as the third preferred embodiment a third absorption means for absorbing blue can also be provided in the blue CRT display apparatus 10B without increasing the drive current for the blue CRT display apparatus 10B.

It is said in general that luminous efficiency is proportioned as red:green:blue=2:5:1, and blue has low luminous efficiency.

Therefore, being provided in the blue CRT display apparatus 10B, the blue absorption means is not expected to greatly contribute to the contrast. The third light absorption means for absorbing blue can also be provided in the blue CRT display apparatus 10B in order to perform balance adjustment with respect to the green brightness in the first preferred embodiment or balance adjustment with respect to the green and red brightness in the second preferred embodiment. Thus, it is possible to balance and adjust the brightness more precisely than respectively adjusting the brightness of green and red.

However, since blue originally has a low brightness, the brightness of blue is adjusted to the extent that the quality of image of the image projected on the screen unit 14 does not reduced considerably.

The degree of fall in blue brightness is determined in view of balance with respect to the green brightness and the red brightness.

The third light absorption means can be provided at any portion of the blue CRT display apparatus 10B. Its preferred embodiment will be described below.

First Example of Third Light Absorption Means

Figure 10A:
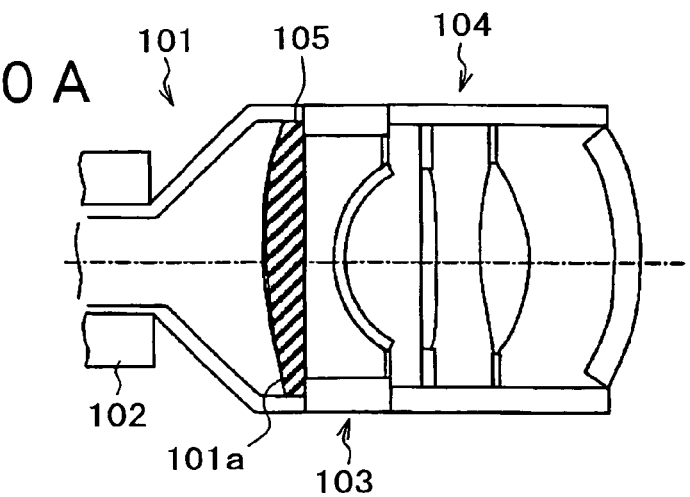
FIG. 10(A) to FIG. 10(C) are views illustrating an exemplary example in which the second light absorption means is provided in a blue CRT display apparatus as a third preferred embodiment of the present invention.

As illustrated in FIG. 10(A) the third light absorption means can be arranged to tint (colorize) the face glass 105 on the front surface of the CRT display tube 101 in the blue CRT display apparatus 10B, by means of a material which absorbs blue. The face glass 105 as shown hatched in FIG. 10(A) illustrates that it has been tinted.

The degree of absorption of blue in the tinted face glass 105 is determined in view of the balance with respect to the green brightness and the red brightness.

As illustrated in FIG. 5 the face glass 105 in the blue CRT display apparatus 10B is tinted in blue, so as to reduce the stray light generated within the face glass 105 and in the circumference portions, such as the cooling fluid 103a in the coupler 103 and the projection lens unit 104, etc., that is the light illuminating the fluorescent material provided in the CRT display tube 101, from the outside of the CRT display tube 101, and to improve the contrast.

Second Example of Third Light Absorption Means

Figure 10B:
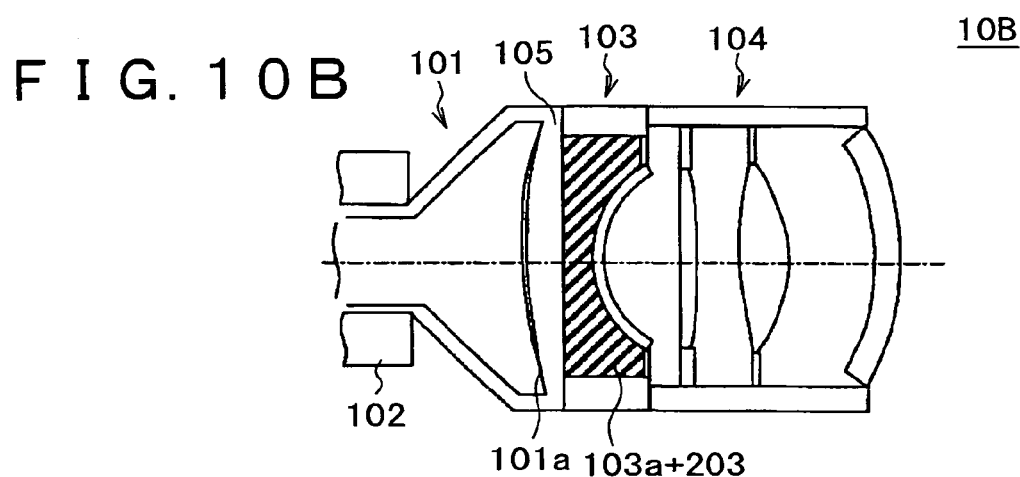

As illustrated in FIG. 10(B) the third light absorption means can be arranged to cause the cooling fluid 103a in the coupler 103 in the blue CRT display apparatus 10B to contain a medium 203 which absorbs blue. The cooling fluid 103a in the coupler 103 as shown hatched in FIG. 10(B) illustrates that it has been tinted by the tinting medium 203.

The degree of absorption of blue in the tinting medium 203 is determined in view of the balance with respect to the green brightness and the red brightness, for example.

In this case, it is also possible to obtain an effect similar to that when the face glass 105 in the first example is tinted.

Third Example of Third Light Absorption Means

Figure 10C:
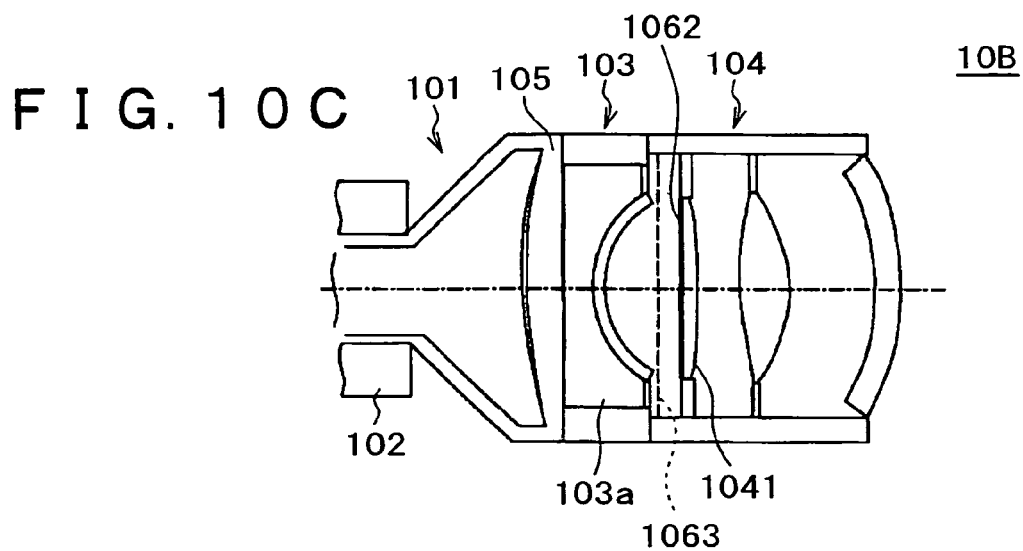

As illustrated in FIG. 10(C) the third light absorption means can be arranged such that a part of a lens 1061 of the projection lens unit 104 in the blue CRT display apparatus 10B is coated with a tinting material 1062 which absorbs blue, or a filter 1063 which absorbs blue can be inserted.

The degree of absorption of blue is determined in view of balance with respect to the green brightness and the red brightness, for example.

In this case, it is also possible to obtain an effect similar to that when the face glass 105 in the first example is tinted.

When implementing the present invention, any one of the first preferred embodiment—the third preferred embodiment can be applied.

According to the present invention, in the projection type display apparatus, the contrast can be improved without causing the brightness of red, green, and blue as a whole to fall.

Moreover, according to the present invention, the drive capacity of the green CRT display tube, more preferably the red CRT display tube, which have sufficient drive capacity can be increased so as to derive the excessive capacity.

Since the light absorption means used for the present invention does not have a particular size, each CRT display apparatus may not be enlarged in size.

As the suitable embodiments of the present invention, although it has been described by way of example that the brightness adjustment for green having the highest luminous efficiency is carried out, then the brightness adjustment for red having higher luminous efficiency is performed, it is not limited to such an order, and also various modifications can be employed.

For example, the green brightness is arranged to be similar to the conventional one, and only the red brightness can be adjusted in such a manner as mentioned above. In other words, the drive current for the red CRT display apparatus 10R is increased so as to raise the red brightness which is reduced by means of the tinted second light absorption means, thus balancing the red brightness with respect to the brightness of green and blue.

As described above, the present invention includes a technical idea based on the premise that the whole balance among the brightness of red, green, and blue, any of the brightness of red, green, and blue is increased, the increased amount of brightness is tinted so as to adjust each of the RGB brightness.

Furthermore, it should be understood by those of ordinary skill in the art that the description above show mere examples of preferred embodiments of the present invention. Therefore, the present invention should not limited to such embodiments, so that many other modifications, variations, combinations, sub-combinations, etc. of such embodiments and equivalents thereof may be made without departing from the scope and spirit of the present invention.

What is claimed is:

1. A projection display apparatus configured to project an image outputted from three monochrome CRT display apparatuses which respectively output red, green, and blue image lights to be synthesized on a screen, wherein the monochrome CRT display apparatus configured to output green light comprises:
   a first light absorption unit configured to reduce a brightness of the green image light to be balanced with respect to a red and blue brightness of the red and blue image lights, the first light absorption unit including a face glass tinted with a material that absorbs green light; and
   a drive current unit configured to increase a drive current of the monochrome CRT display apparatus configured to output green light to increase a brightness of the green image light by an amount reduced by the first light absorption unit.

2. The projection type display apparatus according to claim 1, wherein the monochrome CRT display apparatus configured to output red light comprises:
   a second light absorption unit configured to reduce a brightness of the red image light be balanced with respect to a green and blue brightness of the green and blue image lights, and
   the drive current unit is further configured to increase a drive current of the monochrome CRT display apparatus configured to output red light to increase a brightness of the red image light by an amount reduced by the second light absorption unit.

3. The projection display apparatus according to claim 1, the monochrome CRT display apparatus configured to output blue light comprises:
   a third light absorption unit configured to reduce a brightness of the blue image light to be balanced with respect to a green and red brightness of the green and red image lights.

4. A projection display apparatus configured to project an image outputted from three monochrome CRT display apparatuses which respectively output red, green, and blue image lights to be synthesized on a screen, wherein the monochrome CRT display apparatus configured to output green light comprises:
   a first light absorption unit configured to reduce a brightness of the green image light to be balanced with respect to a red and blue brightness of the red and blue image lights, the first light absorption unit including
     a CRT display tube provided with a face glass on a front surface,
     a coupler filled with cooling fluid and provided on a front surface of the CRT display tube,
     a lens unit provided on a front surface of the coupler, and
     a light absorption liquid, mixed with the cooling fluid, that absorbs green light; and
   a drive current unit configured to increase a drive current of the monochrome CRT display apparatus configured to output green light to increase a brightness of the green image light by an amount reduced by the first light absorption unit.

5. A projection display apparatus configured to project an image outputted from three monochrome CRT display apparatuses which respectively output red, green, and blue image lights to be synthesized on a screen, wherein the monochrome CRT display apparatus configured to output green light comprises:

a first light absorption unit configured to reduce a brightness of the green image light to be balanced with respect to a red and blue brightness of the red and blue image lights, the first light absorption unit including
a CRT display tube provided with a face glass on a front surface,
a coupler provided on a front surface of the CRT display tube and filled with cooling fluid, and
a lens unit provided on a front surface of the coupler, wherein
the lens unit includes a lens coated with a material that absorbs green light or the lens unit includes a filter configured to absorb green light; and
a drive current unit configured to increase a drive current of the monochrome CRT display apparatus configured to output green light to increase a brightness of the green image light by an amount reduced by the first light absorption unit.

6. The projection display apparatus according to claim 2, wherein
the red CRT display apparatus includes a CRT display tube provided with face glass on a front surface, and the face glass is tinted with a light absorption agent that absorbs red light.

7. The projection display apparatus according to claim 2, wherein the red CRT display apparatus includes
a CRT display tube provided with a face glass on a front surfaces,
a coupler provided on a front surface of the CRT display tube and filled with a cooling fluid; and
a lens unit provided on a front surface of the coupler, wherein the cooling liquid includes a light absorption liquid that absorbs red light.

8. The projection display apparatus according to claim 2, wherein the red CRT display apparatus comprises:
a CRT display tube provided with a face glass on a front surface;
a coupler provided on a front surface of the CRT display tube and filled with a cooling fluid; and
a lens unit provided on a front surface of the coupler, wherein the lens unit includes an absorption liquid that absorbs red light.

9. The projection display apparatus according to claim 3, wherein
the blue CRT display apparatus comprises a CRT display tube provided with a face glass on a front surface; and the face glass includes a light absorption agent that absorbs blue light.

10. The projection display apparatus according to claim 3, wherein the blue CRT display apparatus comprises:
a CRT display tube provided with a face glass on a front surface;
a coupler provided on a front surface of the CRT display tube and filled with a cooling fluid; and
a lens unit provided on a front surface of the coupler, wherein
a light absorption liquid that absorbs blue light is mixed with the cooling fluid filled into the coupler.

11. The projection display apparatus according to claim 3, wherein the blue CRT display apparatus comprises:
a CRT display tube provided with a face glass on a front surface;
a coupler provided on a front surface of the CRT display tube and filled with a cooling fluid; and
a lens unit provided on a front surface of the coupler, wherein
the lens unit includes an absorption liquid that absorbs blue light.

12. The projection display apparatus according to any of claims 1, 4, or 5, wherein the three monochrome CRT display apparatuses include a red color CRT display apparatus, a green color CRT display apparatus, and a blue color CRT display apparatus, and the projection display apparatus further comprises:
a reflecting mirror configured to receive and reflect an image from the red color CRT display apparatus, the green color CRT display apparatus and the blue color CRT display apparatus; and
a screen unit configured to project the image reflected in the reflecting mirror,
wherein each of the red color CRT display apparatus, the green color CRT display apparatus and the blue color CRT display apparatus comprises:
a CRT display tube provided with a face glass on a front surface;
a coupler provided on a front surface of the CRT display tube and filled with a cooling fluid; and
a lens unit provided on a front surface of the coupler; and
the screen unit comprises: a Fresnel lens, a lenticular lens, and a screen.

* * * * *